UNITED STATES PATENT OFFICE 2,671,800

PROCESS OF PREPARING BISULFITE ADDITION PRODUCTS OF MALONALDEHYDE

John W. Copenhaver, Easton, Pa., assignor to General Aniline & Film Corporation, New York, N. Y., a corporation of Delaware No Drawing. Application November 16, 1948, Serial No. 60,407

1 Claim. (Cl. 260—513)

This invention relates to bisulfite addition products of malonaldehyde, and a process of producing the same.

It has been discovered that the bisulfite addition compounds of malonaldehyde and substituted malonaldehydes may be readily prepared by the reaction of a diacetal of malonaldehyde or substituted malonaldehyde with a water-soluble bisulfite salt of an alkali metal under slightly acidic conditions. These bisulfite addition compounds of malonaldehyde are themselves new chemical compounds and are useful as intermediates in the synthesis of numerous organic compounds, and which also provide a ready source of malonaldehyde under acid or alkaline conditions. The acetal group of malonaldehyde acetals are relatively stable in alkaline solution and hence, the bisulfite addition products of malonaldehyde diacetal are particularly valuable for use in syntheses in which a source of malonaldehyde is desired, and which are to be carried out in alkaline media, since under these conditions malonaldehyde acetals do not react to form malonaldehyde.

The formation of the bisulfite addition products of malonaldehyde is illustrated by the following equation:

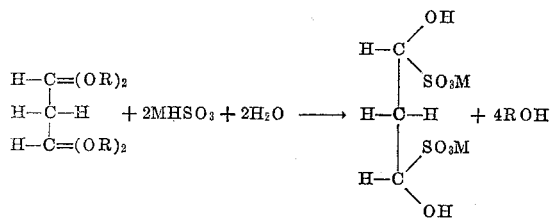

where the R's are the same or different hydrocarbon radicals, and where M is any metal whose bisulfite compound is appreciably water-soluble.

The reaction may be carried out by vigorously mixing a malonaldehyde diacetal with an aqueous solution of an inorganic bisulfite and the resultant two-phase solution should be vigorously stirred until completion of the reaction, as indicated by the disappearance of the acetal layer or formation of a clear and colorless one-phase solution. While the reaction will proceed at room temperature, it is relatively slow and it is therefore recommended that the reaction mixture be heated to a temperature of from 50–100° C., preferably from 60–70° C., in order to accelerate it. It has also been found that certain commercially available water-soluble inorganic bisulfites do not give aqueous solutions of sufficient acidity to rapidly hydrolyze the original acetal and it has been found that the introduction of sulfur dioxide into the reaction mixture materially accelerates the hydrolysis and results in an appreciable decrease in the reaction time. The addition of other acidic materials (to a lower pH) such as sulfuric acid, would also induce reaction.

The desired bisulfite addition product of malonaldehyde is readily recovered by merely cooling the reaction mixture. If further purification is desired, the product may be recrystallized from water without difficulty. While any water-soluble inorganic bisulfite may be employed in practicing the present invention, as a practical matter the water-soluble alkali metal bisulfites (sodium or potassium bisulfite) will ordinarily be used.

As is apparent from the above equation, the particular diacetal of malonaldehyde which is employed in practicing the present invention does not affect the operability of the process or the nature of the product obtained, since alcohol or phenol is formed as a by-product of the reaction by hydrolysis of the acetal. However, as a practical matter it is preferred to employ the lower alkyl acetals of malonaldehyde, since these may readily be produced in good yield and at a low cost and thus, such diacetals as tetramethyl acetal of malonaldehyde and tetraethyl acetal of malonaldehyde or mixed diacetals such as methyl triethyl acetal of malonaldehyde and ethyl triethyl acetal of malonaldehyde will usually be employed in practicing the present invention.

The details of the present invention will be apparent to those skilled in the art from a consideration of the following specific example, in which the parts are by weight:

Example

To a solution of 120 parts commercial sodium bisulfite (mostly $Na_2S_2O_5$) in 500–600 parts water is added 103 parts methyl triethyl malonaldehyde acetal and the resultant two-phase solution is stirred vigorously and heated to 60–70° C. while $SO_2$ gas is passed through the solution. When the reaction is one-phase, clear and colorless, the $SO_2$ is stopped and the reaction chilled, thereby precipitating a 75–80% yield of the sodium bisulfite addition compound of malonaldehyde.

It will also be apparent that the bisulfite addition products of 2-substituted malonaldehydes may readily be produced by the process of this invention by merely substituting for the unsubstituted malonaldehyde diacetals previously mentioned a diacetal of a 2-substituted malonaldehyde corresponding to the 2-substituted malonaldehyde whose bisulfite addition product is desired. The type of 2-substituted malonaldehydes which may be considered as the equivalent of the methyl triethyl acetal of malonaldehyde used in the foregoing example when it is desired to obtain the bisulfite addition products of 2-substituted malonaldehydes, as well as the general nature of the reaction, are illustrated by the following general equation:

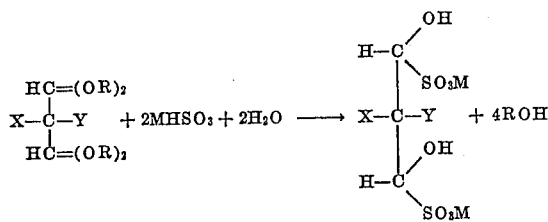

wherein R and M are as previously defined and X and Y stand for the same or different substituents of the group consisting of halogen, hydroxyl, amino, alkyl, aryl, alkoxy, aryloxy, thioalkyl and hydrogen. These diacetals of 2-substituted malonaldehydes may be exemplified by the diacetals of halo-malonaldehyde, disclosed in the copending application of R. Kleinschmidt Serial No. -9021, filed February 17, 1948, and now abandoned.

I claim:

The method of producing bisulfite addition products of malonaldehyde having the formula

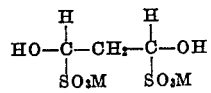

wherein M represents alkali metal, which comprises mixing a diacetal of malonaldehyde having the formula

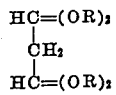

wherein R represents a lower alkyl radical, with an alkali metal bisulfite in the presence of water and sulfur dioxide.

JOHN W. COPENHAVER.

References Cited in the file of this patent

FOREIGN PATENTS

| Number | Country | Date |
|---|---|---|
| 212,070 | Germany | July 11, 1948 |

OTHER REFERENCES

Harries, Berichte, vol. 34, p. 1496.
Beilstein, vol. 1, 2nd Supp., page 817.
"Organic Chemistry," by Karrer, 2nd ed., (1942) pp. 151–152.
Ekeley, Am. Soc., vol. 50, page 2731.
Schroeter, Ann. der Chemie (Liebig) vol. 303, page 121.
"Organic Chemistry," by Karrer, (1938) pp. 141–142.
"Formaldehyde," by Walker, (1944) page 139.